(12) United States Patent
Constantinou

(10) Patent No.: US 6,450,193 B1
(45) Date of Patent: Sep. 17, 2002

(54) FLAMMABLE LIQUIDS

(75) Inventor: Chrisostomos Constantinou, Cheltenham (GB)

(73) Assignee: BAE Systems plc, Farnborough (GB)

(*) Notice: Subject to any disclaimer, the term of this patent is extended or adjusted under 35 U.S.C. 154(b) by 0 days.

(21) Appl. No.: 09/719,744
(22) PCT Filed: Oct. 20, 2000
(86) PCT No.: PCT/GB00/04044
§ 371 (c)(1), (2), (4) Date: Dec. 15, 2000
(87) PCT Pub. No.: WO01/32507
PCT Pub. Date: May 10, 2001

(30) Foreign Application Priority Data

Oct. 30, 1999 (GB) .................................... 9925718

(51) Int. Cl.[7] .............................................. B64D 37/32
(52) U.S. Cl. .................... 137/209; 137/256; 137/264; 137/576; 244/135 R
(58) Field of Search ................. 137/206, 209, 137/264, 256, 571, 576; 244/135 R, 135 C; 220/88.3, 900

(56) References Cited

U.S. PATENT DOCUMENTS

| | | | | |
|---|---|---|---|---|
| 845,804 A | * | 3/1907 | Martin | 137/571 |
| 1,382,863 A | * | 6/1921 | Slishman | 137/571 |
| 1,548,590 A | * | 8/1925 | Farkas | 137/264 |
| 2,293,263 A | * | 8/1942 | Kornemann et al. | 137/264 X |
| 2,404,418 A | * | 7/1946 | Walker | 244/135 R X |
| 2,464,827 A | | 3/1949 | Noyes | |
| 2,719,583 A | * | 10/1955 | Malick | 137/264 X |
| 2,889,955 A | * | 6/1959 | Naulty et al. | 220/88.3 |
| 2,995,268 A | * | 8/1961 | Kurtovich | 244/135 R |
| 3,520,329 A | * | 7/1970 | Weber | 137/571 |
| 3,804,292 A | * | 4/1974 | Chiti | 220/88.3 |
| 3,827,455 A | * | 8/1974 | Lee | 137/264 X |
| 3,924,773 A | * | 12/1975 | Wilkinson | 220/88.3 |
| 4,294,279 A | * | 10/1981 | Wyeth | 137/264 |
| 4,587,992 A | * | 5/1986 | Thompson | 137/576 |
| 4,886,225 A | * | 12/1989 | Bates | 244/135 R |

FOREIGN PATENT DOCUMENTS

| | | |
|---|---|---|
| DE | 32 46 190 A1 | 6/1984 |
| FR | 1 258 293 A | 7/1961 |
| GB | 150 053 | 8/1920 |
| GB | 565 121 A | 10/1944 |
| GB | 1 001 969 | 8/1965 |
| GB | 1 429 910 | 3/1976 |

* cited by examiner

*Primary Examiner*—John Rivell
(74) *Attorney, Agent, or Firm*—Nixon & Vanderhye P.C.

(57) ABSTRACT

An aircraft fuel tank (101) comprises an inner and an outer chamber (103, 105) which are fluidly interconnected via a plurality of open-ended pipes (109). A non-flammable gas, which is immiscible with the fuel (119), is pumped into the outer chamber (103) on demand to displace the fuel (119) into the less vulnerable inner chamber (105) and thereby forms a protective non-flammable gaseous barrier around the fuel-retaining inner chamber (105). The fuel tank (101) is used primarily for military aircraft and provides the ability to attenuate hydrodynamic ram effects arising in the fuel following penetration of the fuel tank (101) by a projectile. All round protection is achieved because the inner chamber (105) is contained wholly within the outer chamber (103).

26 Claims, 1 Drawing Sheet

FLAMMABLE LIQUIDS

BACKGROUND OF THE INVENTION

1. Field of the Invention

The present invention concerns improvements relating to flammable liquid storage, namely a container for storing flammable liquid and a method of reconfiguring the container to obviate so-called hydrodynamic ram effects within the liquid. More particularly, though not exclusively, the present invention relates to a fuel tank of a military aircraft, aiming to reduce the risk of catastrophic failure of the tank following penetration by a projectile.

2. Discussion of Prior Art

The fuel tank is one of the most vulnerable components within a military aircraft when it is under attack, particularly during low-level flying operations. Penetration of the tank can result in limited loss of fuel at best, but severe disablement or destruction of the aircraft at worst.

If the tank is pierced by an incendiary projectile, the projectile's burning trail can ignite the fuel load and cause a devastating, rapidly progressive fire. However, penetration alone by projectiles of a sufficiently large diameter can cause catastrophic failure of the tank by way of hydrodynamic ram effects within liquid fuel.

When a projectile impacts the fuel tank it transfers much of its kinetic energy to the liquid held inside. If the projectile goes on to pierce the tank it violently displaces fuel at the point of entry, radiating a shock wave from the impact site. Although the liquid is able to dissipate this wave quickly, the liquid is relatively incompressible and is unable to absorb the pressure waves generated by the projectile as it traverses the tank. Such pressure waves propagate with the sonic velocity of the liquid, which is far greater than that of the projectile. The pressure waves are thus transmitted ahead of the projectile, creating intense pressure at the point where the projectile will impact the internal wall of the tank. These hydrodynamic ram effects within the liquid fuel cause the projectile's exit aperture from the tank to be far larger than its entrance aperture.

As a result of space ergonomics, fuel tanks in jet aircraft are generally located alongside the engine inlet ducts. The fuel tank can therefore be pierced in such a way so as to severely rupture the wall shared with the engine duct. Large quantities of fuel can then be drawn into the engine of the aircraft, causing an explosion of massive proportions.

In addressing the problem of catastrophic fuel tank failure, both the space occupied by the tank and its weight must be kept to a minimum, whilst the capacity of the tank should be maintained.

Various attempts have been made previously to address fuel tank failure. For example, U.S. Pat. No. 4,345,698 describes a self-sealing tank which is able to seal apertures made by smaller projectiles and maintain the integrity of the tank, as the associated hydrodynamic ram effects are of little consequence. This method of protection is not effective against larger caliber projectiles, such as 23 mm HEI (high explosive incendiary) ammunition, which as well as producing apertures which are too large to be self-sealed, also generate considerable hydrodynamic ram effects within the fuel.

U.S. Pat. No. 4,469,295 describes a segmented fuel tank, where fuel is first removed from an auxiliary tank to form a protective crumple zone at one side of a main tank, in order to attenuate the hydrodynamic ram effects caused by larger projectiles. The required protection is only available once the fuel in the auxiliary tank has been used up and this can present a problem for protection of the tank at an early stage in the aircraft's mission. Also separate pumps are required for the auxiliary tank and the main tank, which increases the weight of the fuel distribution system.

U.S. Pat. No. 4,886,225 describes a fuel tank with an inflatable bladder attached along the fuel tank wall shared with an engine inlet duct. This inflatable bladder only provides a protective barrier when inflated, usually when the aircraft is under attack. However, the bladder is inflated at a preselected time during flight, usually after a certain quantity of fuel has been consumed. The limited protection afforded by this device is not available initially and so the aircraft can be vulnerable for an initial period of time.

The previous attempts to reduce catastrophic fuel tank failure thus far have had only limited success. The US Air Force, for example, presently cites hydrodynamic ram effect-related deaths as the main source of fatalities on board military aircraft.

SUMMARY OF THE INVENTION

It is therefore an objective of this invention to substantially reduce or overcome at least some of the above described problems. More specifically, it is desired to reduce the present vulnerability of aircraft fuel tanks in the face of enemy fire.

It is a further aim to improve on the designs of currently available aircraft fuel tanks.

According to one aspect of the present invention there is provided a container for storing a flammable liquid, the container comprising a first and a second chamber in fluid communication with each other, and displacing means for displacing the liquid from the first chamber to the second chamber on demand for creating a protective barrier within the container.

The present invention provides control in the creation of the protective barrier and this enables the protective barrier to be formed at any time on demand. Furthermore when the displacing means is activated, any fuel present in the first chamber can be transferred into the second chamber to maximise the amount of protected fuel storage available at that instant in time.

Preferably, the second chamber is contained substantially within the first chamber. This provides improved dimensional protection of the second chamber and reduces the possibility of the hydrodynamic ram effect occurring on impact of a projectile. In fact, the liquid retaining walls of the second chamber may together form a cavity surrounding the second chamber such that the displacing means is arranged to create the protective barrier substantially surrounding the second chamber in use. This advantageously provides maximum protection from the effects of hydrodynamic ram caused by projectile penetration because a penetrating projectile from any direction will never encounter a liquid retaining wall. Any projectile would also have to pass through two tank walls before gaining contact with the flammable liquid.

In order to advantageously expedite rapid evacuation of liquid from the first chamber to the second chamber, the fluid communication between the first and the second chambers preferably comprises a plurality of fluid passageways.

The displacing means may be arranged to introduce a gas into the first chamber to effect the displacement of the liquid into the second chamber. The resulting protective layer of gas is able to dissipate the pressure waves generated by the intrusion of the projectile, as it is readily compressible in comparison to the non-flammable liquid. Consequently any exit aperture of the projectile will be comparable in size to its entrance aperture, preventing the sudden escape of a large quantity of fuel. Preferably, the gas is non-flammable thereby extinguishing any projectile's burning trail and, more preferably, the gas is substantially inert (like, for example, nitrogen or carbon dioxide), providing no storage hazard.

The container may further comprise collecting means for collecting the gas from the second chamber and recycling the gas for use with the displacing means. In this way, the amount of gas required to maintain the protective barrier is minimised, thereby improving space and weight characteristics over prior art systems.

The container preferably comprises a fuel tank for use in an aircraft. The advantages of the present invention are best realised in the context of such an aircraft fuel tank. However, it would be possible for the present invention to be applied to various military fuel transporters—such as ships and vehicles where there is a risk of projectile penetration under enemy fire.

The present invention also extends to a reconfigurable fuel storage system comprising a container, as described above, and control means connected to the displacing means of the container for controlling the activation of the displacing means. In addition, an aircraft employing such a reconfigurable fuel storage system or a container described above, is also part of the present invention.

According to another aspect of the present invention, there is provided a method of reconfiguring a container for storing a flammable liquid, the method comprising providing the flammable liquid to a first and a second chamber of the container, having fluid communication therebetween, and, on demand, creating a protective barrier within the container by displacing the liquid from the first chamber to the second chamber.

BRIEF DESCRIPTION OF THE DRAWINGS

Presently preferred embodiments of the present invention will now be described with reference to the accompanying drawings. In the drawings.

DETAILED DISCUSSION OF EMBODIMENTS

Figure 1:
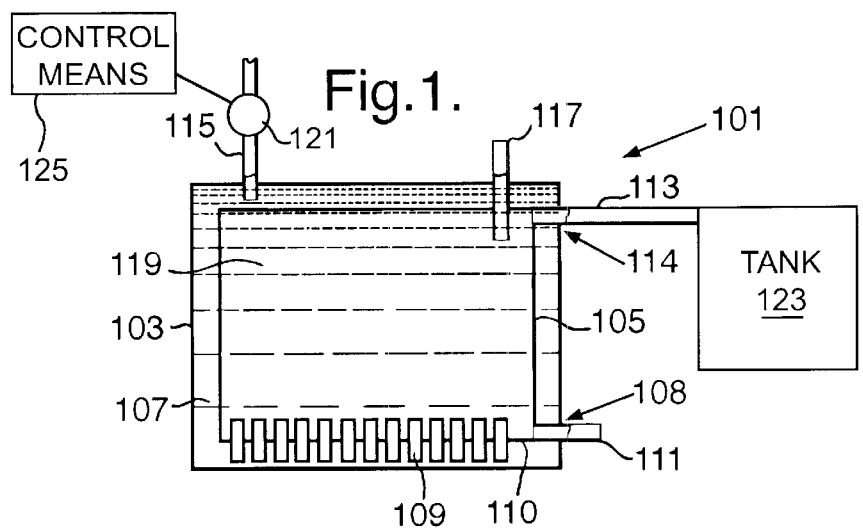
FIG. 1 is a schematic sectional view of an aircraft fuel tank filled to capacity with fuel according to an embodiment of the present invention.

Referring to FIG. 1, an aircraft fuel tank 101 embodying the present invention is now described together with its operation in an aircraft. The aircraft fuel tank 101 comprises an outer chamber 103 and an inner chamber 105. Inner chamber 105 is substantially contained within the outer chamber 103, providing the inner chamber 105 with a surrounding cavity 107. The fuel tank 101 comprises thirteen open-ended pipes 109 provided at a lower portion (base) 108 of the inner chamber 105 protruding above and below a base wall 110. These open-ended pipes 109 provide a fluid communication between the inner and outer chambers 105 and 103, respectively. A fuelling pipe 111 is also provided at the lower portion 108 of the inner chamber 105 for supplying fuel from the tank 101 to the aircraft's jet engines (not shown), whilst an overflow pipe 113 exits from an upper portion 114 of the inner chamber 105 and provides a means for removing excess fuel from the tank 101. An entrance pipe 115 to the fuel tank 101 is provided leading into the outer chamber 103, whilst an exit pipe 117 of the fuel tank 101 passes from the inner chamber 105, across the cavity 107 and beyond the outer chamber 103.

FIG. 1 shows the fuel tank 101 filled to capacity with aircraft fuel 119. The open-ended pipes 109, which interconnect the inner and outer chambers 105, 103, allow the entire volume of tank 101 to be utilised as will be described in detail hereinafter. Typically, this configuration, namely a full fuel tank 101, is provided at the beginning of the aircraft's mission.

Figure 2:
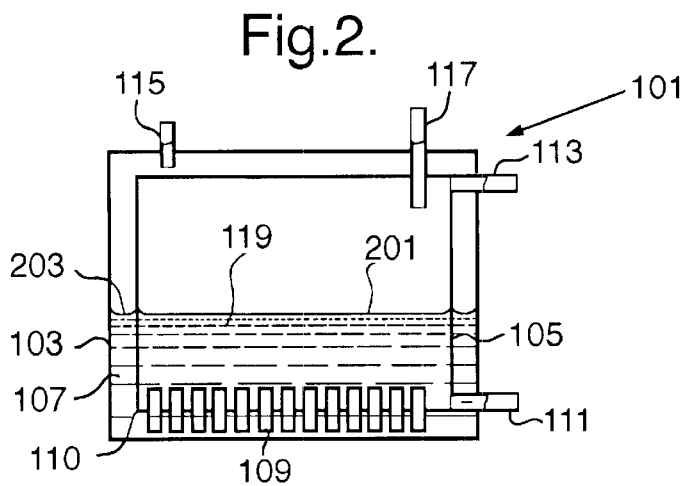
FIG. 2 is a schematic sectional view of the fuel tank of FIG. 1 after some of the fuel has been supplied from the fuel tank for consumption.

FIG. 2 shows fuel tank 101 some time after take off, when the aircraft has utilised some of fuel 119. The fuel 119 is pumped out of the fuel tank 101 via a fuel pump (not shown) which is provided in line with the fuelling pipe 111. Fuel levels 201,203 in the inner and outer chambers 105, 103 respectively, fall appreciably at the same rate during fuel consumption.

Figure 3:
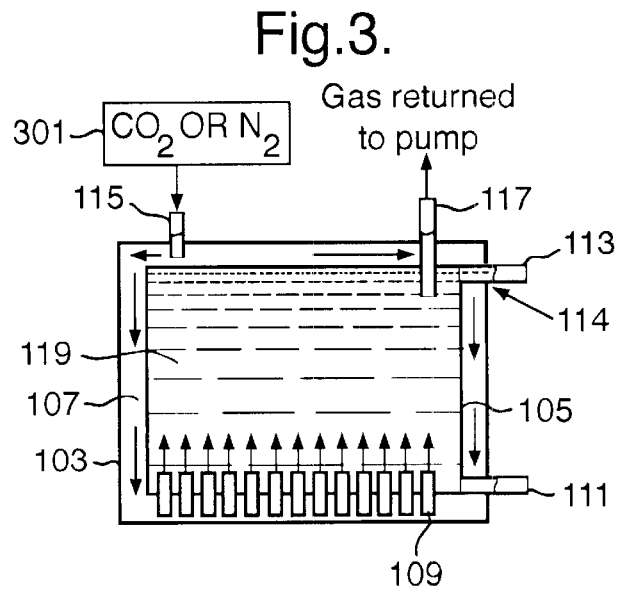
FIG. 3 shows the container of FIG. 1 after a gas pumping system has been activated and all of the fuel has been displaced from an outer chamber into an inner chamber.

At some point during the aircraft's mission, when there is a perceived threat, a non-flammable gas 301 which is substantially inert and does not react with fuel 119 (such as nitrogen or carbon dioxide) is introduced into the fuel tank 101 through the entrance pipe 115, as shown in FIG. 3. An electronic pumping system 121 is used for supplying the non-flammable gas 301 to the cavity 107. The electronic pumping system 121 is readily activated by a pilot of the aircraft with control means 125 or can be triggered by some sensor electronics (not shown).

The increased pressure on fuel level 203 exerted by the gas 301 causes the fuel 119 in the outer chamber 103 to be transferred to the inner chamber 105 via the open-ended pipes 109. The provision of a plurality of pipes ensures that this transfer occurs rapidly. Eventually, substantially all of the fuel 119 in the cavity 107 is transferred into the inner chamber 105 and the non-flammable gas 301 is able to circulate throughout the cavity 107. However, some of the gas passes through the open-ended pipes 109, bubbling up through the inner chamber 105, since it is of lower density than the fuel 119. The provision of pipes 109, rather than simple orifices, which protrude into the inner chamber 105 beyond the level of the entrance of fuelling pipe 111, helps to prevent the gas from inadvertently escaping through the fuelling pipe 111. The gas 301 rises through the fuel 119 in the inner chamber 105 and then out of the upper portion 114 of the inner chamber 105 through the exit pipe 117. It is then returned to the electronic pumping system for recycling back into the cavity 107, as indicated schematically in FIG. 3.

As well as engaging the gas pumping system in the face of an enemy threat, the overflow pipe 113 also has to be enabled. Prior to this point in time, the overflow pipe 113 needs to be kept closed by means of a valve (not shown) to avoid inadvertent leakage of fuel 119, when the tank is full, for example. Hence, the activation of the electronic pumping system is coupled with the opening of the valve in the overflow pipe 113. In the event of the fuel tank 101 containing a volume of fuel in excess of the capacity of the inner chamber 105 at the point of activation of the system, the excess fuel is drained off via the overflow pipe 113. The exit pipe 117 can also act as an alternative to the overflow pipe 113 in that excess fuel can also be removed from the inner chamber 105 via the exit pipe 117. In this case, a mechanism (not shown) for separating the gas 301 and the fuel 119 is provided. In the presently preferred embodiment of the present invention, the surplus fuel is directed to an auxiliary fuel tank 123, located at a less vulnerable position within the aircraft, for subsequent use. In an alternative embodiment, the fuel is simply dumped jettisoned) from the aircraft.

The electronic pumping system can optionally be activated by the pilot at take off and can remain activated for the entire mission. In this case, the fuel 119 is transferred to the inner chamber 105 at the start of the mission with the appropriate transfer of excess fuel to the auxiliary tank and protection from hydrodynamic ram effects is immediate. If protection is required throughout the mission, the gas pumping system needs to be in an activated state generating a constant recirculating flow of gas 301 into the outer chamber 103, through the pipes 109 and out of the inner chamber 105, thereby maintaining the protective gas barrier.

In this way, a barrier of non-flammable gas 301 surrounding the inner chamber 105 may be created and maintained. This provides protection for the fuel tank 101 from all directions. This gaseous cavity is able to attenuate hydrodynamic ram effects following penetration of outer chamber 103 by a projectile. Primarily, this is because the gas is readily compressed and as such it absorbs the pressure shock waves generated by the impact of the projectile. In the event of inner chamber 105 also being pierced by the projectile, any fuel 119 lost upon the failure of the inner chamber 105 would be substantially contained by the outer chamber 103, preventing catastrophic failure of the fuel tank 101. The non-flammable gas barrier also helps to prevent the fuel 119 in the tank 101 from igniting and combusting when the projectile is an incendiary device.

Many variations of the fuel tank (container) 101 are possible without departing from the inventive concept. It will be clear to those skilled in the art that different configurations of the fuel tank 101 are entirely possible. For example, its shape and dimensions, the positioning of its constituent parts and the means by which it is controlled.

The shape of the fuel tank 101 is by no means restricted to a regular box-like structure. Rather, aircraft ergonomics will dictate that the fuel tank 101 maximise the space available to it. For example, if it were to be positioned next to an engine air duct the fuel tank would benefit in increased capacity by being concave in part so as to fit snugly alongside the cylindrical duct.

The dimensions employed within the fuel tank 101 are also subject to variation. The effectiveness in attenuating hydrodynamic ram effects may be subject to providing cavities of a certain width to cope with projectiles of an expected size. As these dimensions are well known to the skilled addressee, they will not be elaborated on further herein.

It is also anticipated that variation in the location of the fuel tank's constituent parts is entirely possible. For example, rather than having one chamber substantially contained within the other, one could allow the two chambers to share a common wall. In this way a thicker protective barrier could be achieved at one side of the fuel tank 101, offering increased protection in a preferred direction.

In addition, the number of open ended pipes 109 in the fuel tank 101 can be varied, as can their dimensions. For example, variation of the sum of the cross sectional areas of the pipes can be a determining factor in how rapidly fuel can be transferred between the chambers and hence also determines how quickly protection from hydrodynamic ram effects can be achieved.

Variations within the non-flammable gas pumping system are to be expected. For example, the electronic pumping system could also be configured to extract gas from the inner chamber 105, thereby reducing the pressure on the fuel contained within the inner chamber 105 and facilitating evacuation of fuel 109 from the outer chamber 103 via the open-ended pipes 109. Similarly, various different devices can be used for controlling the non-flammable gas pumping system. For example, electrical, mechanical and sensory devices are all possible.

Accordingly, reference should be made to the appended claims and other general statements herein, rather than to the foregoing specific description, as indicating the scope of the invention.

What is claimed is:

1. A container for storing a flammable liquid, the container comprising:
    a first and a second chamber in fluid communication with each other, and
    displacing means for displacing the liquid from the first chamber to the second chamber on demand for creating a protective barrier within the container, wherein the second chamber is contained substantially within the first chamber.

2. A container according to claim 1, wherein liquid retaining walls of the first chamber and liquid retaining walls of the second chamber together form a cavity surrounding the second chamber such that the displacing means is arranged to create the protective barrier substantially surrounding the second chamber in use.

3. A container according to claim 1 wherein the fluid communication between the first and second chambers comprises a plurality of fluid passageways.

4. A container according to claim 1 wherein the displacing means is arranged to introduce a gas into the first chamber to effect the displacement of the flammable liquid into the second chamber.

5. A container according to claim 1, further comprising an outlet for the flammable liquid from the second chamber.

6. A container according to claim 1, wherein the container comprises a fuel tank for use in an aircraft.

7. A reconfigurable fuel storage system comprising a container as described in claim 1 and control means connected to the displacing means of the container for controlling the activation of the displacing means.

8. An aircraft comprising a container or a reconfigurable fuel storage system as described in claim 1.

9. A container according to claim 1, wherein the fluid communication between the first and second chambers comprises a plurality of fluid passageways, wherein said displacing means introduces a gas into the first chamber to displace the flammable liquid into the second chamber and after said displacement bubbles said gas through the flammable liquid in said second chamber.

10. A container for storing a flammable liquid, the container comprising:
    a first and a second chamber in fluid communication with each other, and
    displacing means for displacing the liquid from the first chamber to the second chamber on demand for creating a protective barrier within the container,
    wherein the displacing means is arranged to introduce a gas into the first chamber to effect the displacement of the flammable liquid into the second chamber,
    wherein the gas is non-flammable.

11. A container according to claim 10, wherein the gas is substantially inert.

12. A container for storing a flammable liquid, the container comprising:
- a first and a second chamber in fluid communication with each other, and
- displacing means for displacing the liquid from the first chamber to the second chamber on demand for creating a protective barrier within the container,
- wherein the displacing means is arranged to introduce a gas into the first chamber to effect the displacement of the flammable liquid into the second chamber,
- further comprising collecting means arranged to collect the gas from the second chamber and to recycle the gas for use with the displacing means.

13. A container for storing a flammable liquid, the container comprising:
- a first and a second chamber in fluid communication with each other, and
- displacing means for displacing the liquid from the first chamber to the second chamber on demand for creating a protective barrier within the container,
- wherein the displacing means is arranged to introduce a gas into the first chamber to effect the displacement of the flammable liquid into the second chamber,
- wherein the displacing means comprises a pump mechanism.

14. A container for storing a flammable liquid, the container comprising:
- a first and a second chamber in fluid communication with each other, and
- displacing means for displacing the liquid from the first chamber to the second chamber on demand for creating a protective barrier within the container,
- further comprising removing means for removing flammable liquid in excess of the capacity of the second chamber when the displacing means is activated to displace the liquid from the first chamber to the second chamber.

15. A container according to claim 14, wherein the removing means is arranged to transfer the excess flammable liquid to another container.

16. A container according to claim 14, wherein the removing means is arranged to dump the excess flammable liquid.

17. A method of reconfiguring a container for storing a flammable liquid, the method comprising the steps of:
- providing the flammable liquid to a first and a second chamber of the container having fluid communication therebetween, and,
- on demand, creating a protective barrier within the container using gas to displace the liquid from the first chamber to the second chamber.

18. A method according to claim 17, wherein the protection barrier creating step comprises introducing a gas into the first chamber to effect the displacement of the flammable liquid from the first chamber to the second chamber.

19. A method according to claim 17, further comprising supplying the flammable liquid from the container via an outlet in the second chamber.

20. A method of reconfiguring a container for storing a flammable liquid, the method comprising the steps of:
- providing the flammable liquid to a first and a second chamber of the container having fluid communication therebetween, and,
- on demand, creating a protective barrier within the container by displacing the liquid from the first chamber to the second chamber,
- wherein the protection barrier creating step comprises creating a protective barrier substantially around the second chamber.

21. A method of reconfiguring a container for storing a flammable liquid, the method comprising the steps of:
- providing the flammable liquid to a first and a second chamber of the container having fluid communication therebetween, and,
- on demand, creating a protective barrier within the container by displacing the liquid from the first chamber to the second chamber,
- wherein the protection barrier creating step comprises introducing a gas into the first chamber to effect the displacement of the flammable liquid from the first chamber to the second chamber,
- further comprising collecting the gas from the second chamber and recycling the gas for use in the creating step.

22. A method of reconfiguring a container for storing a flammable liquid, the method comprising the steps of:
- providing the flammable liquid to a first and a second chambers of the container having fluid communication therebetween, and,
- on demand, creating a protective barrier within the container by displacing the liquid from the first chamber to the second chamber,
- further comprising removing any flammable liquid in excess of the capacity of the second chamber when the liquid is displaced from the first chamber to the second chamber.

23. A method according to claim 22, wherein the removing step comprises removing the excess liquid to a further container.

24. A method according to claim 22, wherein the removing step comprises dumping the excess liquid from the container.

25. A container for storing a flammable liquid, the container comprising a first and a second chamber in fluid communication with each other, and displacing means for displacing the liquid from the first chamber to the second chamber on demand for creating a protective barrier within the container, said second chamber concentrically located within said first chamber.

26. A container according to claim 25, wherein the fluid communication between the first and second chambers comprises a plurality of fluid passageways, wherein said displacing means introduces a gas into the first chamber to displace the flammable liquid into the second chamber and after said displacement bubbles said gas through the flammable liquid in said second chamber.

* * * * *